United States Patent
Suzuki (10) Patent No.: US 11,689,120 B2
(45) Date of Patent: Jun. 27, 2023

(54) CONTROL APPARATUS, CONTROL METHOD, AND DRIVING APPARATUS OF VIBRATION TYPE ACTUATOR

(71) Applicant: CANON KABUSHIKI KAISHA, Tokyo (JP)

(72) Inventor: Kyouhei Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 17/558,102

(22) Filed: Dec. 21, 2021

(65) Prior Publication Data
US 2022/0200484 A1   Jun. 23, 2022

(30) Foreign Application Priority Data
Dec. 23, 2020 (JP) .............................. JP2020-213376

(51) Int. Cl.
| H02N 2/00 | (2006.01) |
| G02B 7/08 | (2021.01) |
| H02N 2/02 | (2006.01) |
| H02N 2/04 | (2006.01) |

(52) U.S. Cl.
CPC ......... *H02N 2/0045* (2013.01); *H02N 2/0015* (2013.01); *G02B 7/08* (2013.01); *H02N 2/02* (2013.01); *H02N 2/04* (2013.01)

(58) Field of Classification Search
CPC ...... H02N 2/0045; H02N 2/0015; H02N 2/02; H02N 2/04; G02B 7/08
See application file for complete search history.

(56) References Cited

U.S. PATENT DOCUMENTS

2017/0194879 A1* 7/2017 Yamanaka ............. H02N 2/008

FOREIGN PATENT DOCUMENTS

JP          2016-152746 A     8/2016

\* cited by examiner

*Primary Examiner* — Emily P Pham
(74) *Attorney, Agent, or Firm* — Cowan, Liebowitz & Latman, P.C.

(57) ABSTRACT

A control apparatus for a vibration type actuator that moves a vibrating body in which vibrations are excited by an electromechanical energy conversion element, and a contact body contacting the vibrating body relative to each other includes a generation unit configured to generate multi-phase driving signals having a phase difference applied to the electromechanical energy conversion element, and a detection unit configured to detect an actual position of a movable unit including the vibrating body or the contact body. The generation unit sets the phase difference based on a deviation of the actual position from a target position of the movable unit. The generation unit makes larger a change rate of the phase difference against the deviation from when the movable unit stops to when the movable unit starts moving as the target position changes than that after the movable unit starts moving.

14 Claims, 9 Drawing Sheets

FIG. 18

CONTROL APPARATUS, CONTROL METHOD, AND DRIVING APPARATUS OF VIBRATION TYPE ACTUATOR

BACKGROUND OF THE INVENTION

Field of the Invention

The present invention relates to a control of a vibration type actuator.

Description of the Related Art

Some of vibration type actuators move a vibrating body and a contact body in contact with a protrusion provided on the vibrating body relative to each other, by applying two driving signals having a phase difference between them to an electromechanical energy conversion element to excite vibrations in the vibrating body and by creating an elliptical motion of the protrusion. A moving speed of a movable unit that is the vibrating body or the contact body can be changed by changing the phase difference between the two driving signals.

Japanese Patent Laid-Open No. 2016-152746 discloses a method of suppressing a decrease in controllability of the vibration type actuator in a low-speed range by setting the phase difference outside a dead zone in which the movable unit stops due to an excessively small phase difference in the low-speed range and a resultant shortage of a driving force.

The phase difference in the dead zone and its width fluctuate due to changes in the orientation of the vibration type actuator, environmental (e.g., temperature) changes, and changes over time. Therefore, it is demanded to suppress a decrease in controllability regardless of these fluctuation factors of the dead zone.

SUMMARY OF THE INVENTION

The present invention provides a control apparatus or the like, each of which can obtain good controllability in a phase difference control of a vibration type actuator.

A control apparatus according to one aspect of the present invention for a vibration type actuator that moves a vibrating body in which vibrations are excited by an electromechanical energy conversion element, and a contact body in contact with the vibrating body relative to each other includes a generation unit configured to generate multi-phase driving signals having a phase difference applied to the electromechanical energy conversion element, and a detection unit configured to detect an actual position of a movable unit including the vibrating body or the contact body. The generation unit sets the phase difference based on a deviation of the actual position from a target position of the movable unit. The generation unit makes larger a change rate of the phase difference against the deviation from when the movable unit stops to when the movable unit starts moving as the target position changes than that after the movable unit starts moving, or the generation unit makes larger an increase rate of the phase difference from when the movable unit stops to when the movable unit starts moving than that after the movable unit starts moving, and decreases the increase rate once and then increases the increase rate when the movable unit starts moving and accelerating.

A driving apparatus according to another aspect of the present invention includes the above control apparatus, the above vibration type actuator, and a driven member driven by the vibration type actuator.

A control method corresponding to the above control apparatus also constitutes another aspect of the present invention. A storage medium storing a program that causes a computer to execute the control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
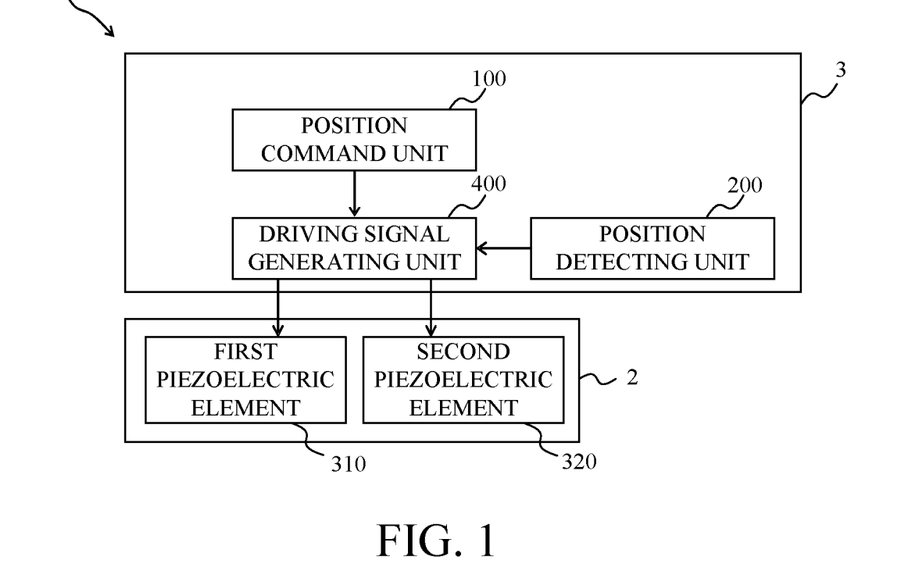
FIG. 1 is a block diagram illustrating an electrical configuration of a vibration type actuator driving system according to this embodiment of the present invention.

FIG. 1 illustrates an electrical configuration of a vibration type actuator driving system 1 according to one embodiment of the present invention. The driving system 1 includes a vibration type actuator 2 and a control apparatus 3 for controlling driving of the vibration type actuator 2. The vibration type actuator 2 includes a first piezoelectric element 310 and a second piezoelectric element 320. Each of the first and second piezoelectric elements 310 and 320 is an electromechanical energy conversion element that is displaced when receiving the voltage. A specific structure of the vibration type actuator 2 will be described later.

The control apparatus 3 includes a position command unit 100, a position detecting unit 200, and a driving signal generating unit (generation unit) 400. The position command unit 100 instructs a target position Xt and a target speed Vt of the movable unit described later in the vibration type actuator 2. The position detecting unit (detection unit) 200 acquires a current position (actual position) Xa of the movable unit. The driving signal generating units 400 generates multi-phase (two phases) driving signals (voltage signals) which are necessary for the movable unit to reach the target position Xt at the target speed Vt, using the instruction from the position command unit 100 and the current position Xa of the movable unit acquired from the position detecting unit 200. Each of these two-phase driving signals is applied to a corresponding one of the first piezoelectric element 310 and the second piezoelectric element 320.

Although the driving signal is a voltage signal in this embodiment, it may be a current signal. Although two piezoelectric elements are used for this embodiment, three or more piezoelectric elements may be used, or three or more phases of driving signals may be applied to the three or more piezoelectric elements.

Figure 2:
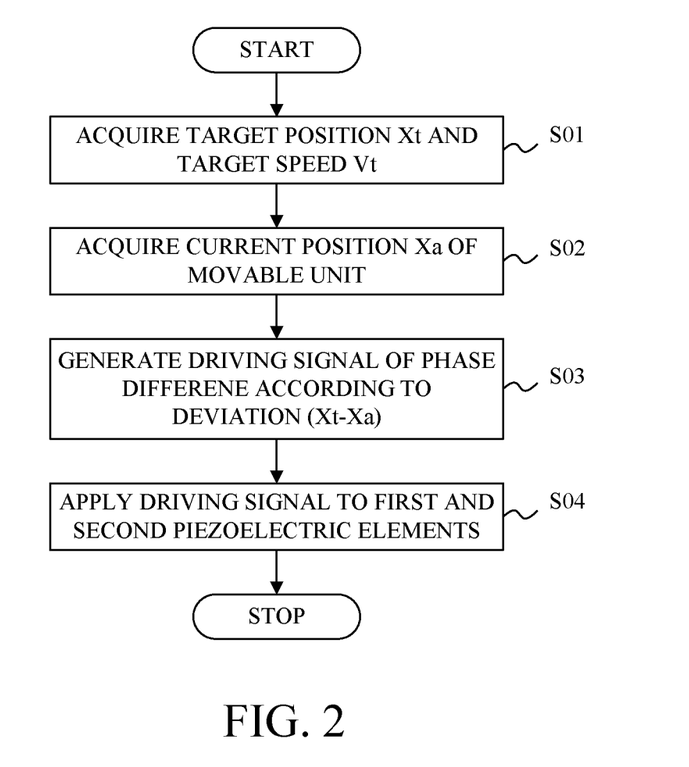
FIG. 2 is a flowchart illustrating control processing of the vibration type actuator according to this embodiment.

A flowchart of FIG. 2 illustrates control processing of the vibration type actuator 2. The driving signal generating unit 400 includes a computer such as a CPU and executes this processing according to a computer program.

In the step S01, the driving signal generating unit 400 acquires the target position Xt and the target speed Vt of the movable unit from the position command unit 100.

In the step S02, the driving signal generating unit 400 acquires the current position Xa of the movable unit detected by the position detecting unit 200.

In the step S03 (generating step), the driving signal generating unit 400 generates two-phase driving signals using the target position Xt of the movable unit acquired from the position command unit 100, the target speed Vt, and the current position Xa of the movable unit acquired from the position detecting unit 200. At this time, the driving signal generating unit 400 sets (controls) a phase difference between the two-phase driving signals based on the deviation of the current position Xa from the target position Xt (that is, according to the deviation itself or the value obtained from the deviation) so that the moving speed of the movable unit can be the target speed Vt.

In the step S04 (applying step), the driving signal generating unit 400 applies the two-phase driving signals generated in the step S03 to the first and second piezoelectric elements 310 and 320. Thereby, the movable unit of the vibration type actuator moves toward the target position Xt while accelerating to the target speed Vt.

Figure 3:
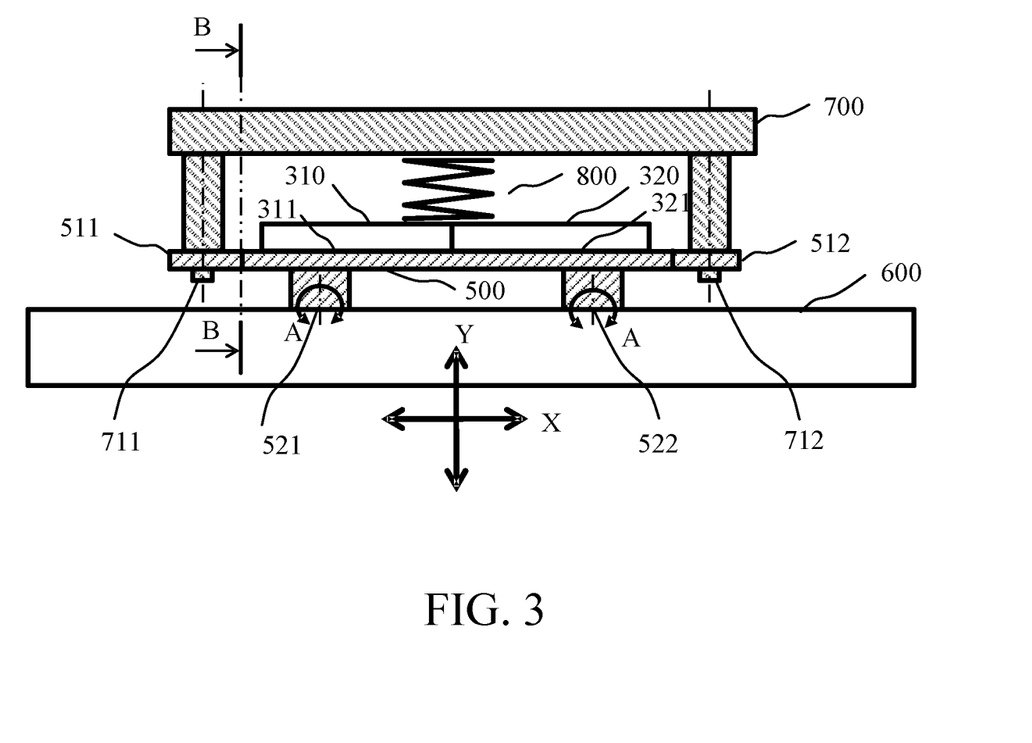
FIG. 3 is a schematic view illustrating a mechanical structure of the vibration type actuator.

FIG. 3 schematically illustrates a mechanical structure of the vibration type actuator 2. The first and second piezoelectric elements 310 and 320 are adhered to an elastic body 500 as a vibrating body by adhesion or the like via joint surfaces 311 and 321 respectively.

Connectors 511 and 512 provided on the elastic body 500 are fixed to convex portions 711 and 712 provided on a holding member 700 by adhesion or the like, respectively. Thereby, the elastic body 500 is fixed to the holding member 700. The holding member 700 is fixed to an unillustrated fixing member. The first piezoelectric element 310, the second piezoelectric element 320, the elastic body 500, and the holding member 700 form a fixed portion that does not move when the movable unit in the vibration type actuator moves.

A pressure spring 800 is a compression spring, a first end of which contacts the holding member 700, and a second end of which contacts at least one of the first and second piezoelectric elements 310 and 320, applying a spring force (pressure) to the elastic body 500 in the Y direction as a pressure direction The pressure spring 800 may be a spring other than the compression spring, or the pressure may be applied to the elastic body 500 by a method other than the spring (such as a magnetic force).

The elastic body 500 that has received the pressure comes into pressure contact with a friction member 600 as a contact body. The elastic body 500 has two protrusions 521 and 522. A tip of each protrusion is a portion that contacts the friction member 600. The friction member 600 constitutes at least a part of the movable unit of the vibration type actuator. That is, only the friction member 600 may be a movable unit, or the movable unit may include the friction member 600 and an unillustrated member that moves or interlocks with the friction member 600.

When the two-phase driving signals having a frequency near the resonance frequency of the elastic body 500 is applied to the first and second piezoelectric elements 310 and 320 by the driving signal generating unit 400, the vibrations are excited to the elastic body 500, and elliptical motions as shown by arrows A occur at the tips of the protrusions 521 and 522. The elliptical motions are propagated by a frictional force to the friction member 600 that is in pressure contact with the tips of the protrusions 521 and 522, so that the movable unit including the friction member 600 moves (translates) in the X direction that is a moving direction.

This embodiment describes a case where the movable unit including the friction member 600 moves relative to the fixed portion including the elastic body 500, but the movable unit including the elastic body may move relative to the fixed portion including the friction member. That is, the elastic body and the contact member may be moved relative to each other.

Figure 4A:
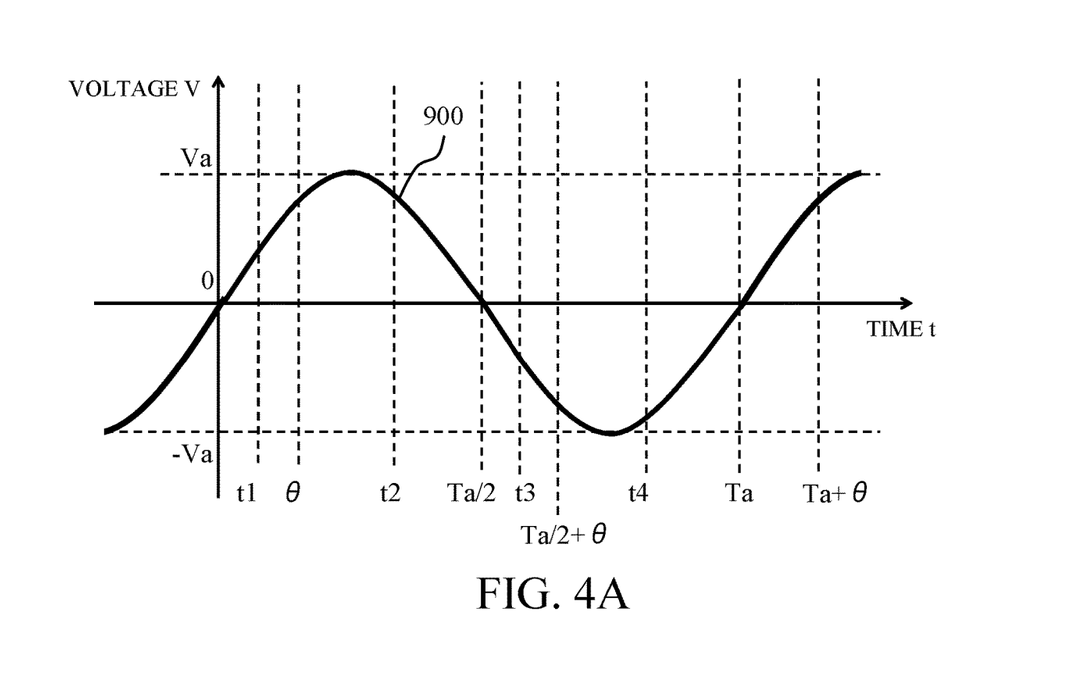
FIGS. 4A and 4B illustrate driving signals applied to piezoelectric elements.
Figure 4B:
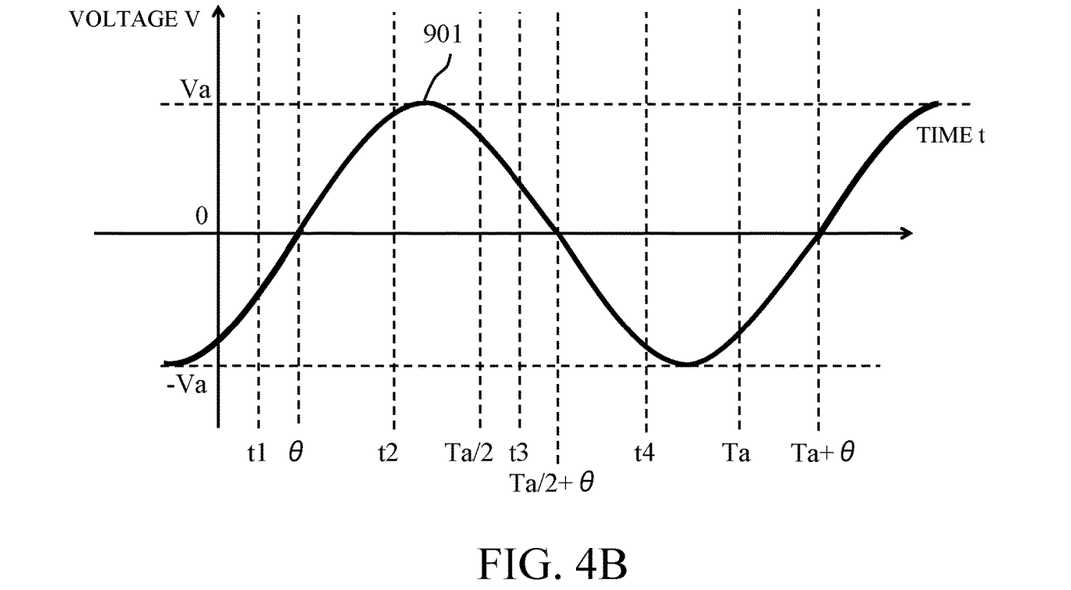

FIGS. 4A and 4B illustrate an example of driving signals applied to the first and second piezoelectric elements 310 and 320, respectively. A horizontal axis represents time t, and a vertical axis represents voltage V as a driving signal value. Two-phase driving signals 900 and 901 are both periodic signals having an amplitude of Va and a period of Ta, and are applied to the first and second piezoelectric elements 310 and 320, respectively. The driving signal 901 applied to the second piezoelectric element 320 has the same waveform as that of the driving signal 900 applied to the first piezoelectric element 310, but its phase shifts by θ. That is, the two-phase driving signals 900 and 901 have a phase difference of θ. The term "same waveform," as used herein, means not only a case where the waveforms are exactly the same, but also a case where they are slightly different in a range where they do not affect the driving of the vibration type actuator or they can be regarded as substantially the same.

In this embodiment, when a positive voltage is applied, the first and second piezoelectric elements 310 and 320 extend in an in-plane direction parallel to the joint surfaces 311 and 321 and contract in a thickness direction orthogonal to the joint surfaces 311, 321 respectively. When the negative voltage is applied, the first and second piezoelectric elements 310 and 320 contract in the in-plane direction and expand in the thickness direction, respectively.

FIGS. 5A to 8B illustrate deformed states of the first and second piezoelectric elements 310 and 320 and the elastic body 500 when the driving signals 900 and 901 are applied to the first and second piezoelectric elements 310 and 320. FIGS. 5A, 6A, 7A, and 8A illustrate a section of the vibration type actuator illustrated in FIG. 3 taken along a line B-B. FIGS. 5B, 6B, 7B and 8B illustrate the first and second piezoelectric elements 310 and 320 and the elastic body 500 viewed from the same direction as that in FIG. 3.

In these figures, arrows 531a, 531b, 531c, and 531d indicate a movement of the tip of the protrusion 521. Similarly, arrows 532a, 532b, 532c, and 532d indicate a movement of the tip of the protrusion 522. The positions indicated by black dots are the positions of the tips of the protrusions 521 and 522 when no voltages are applied to the first and second piezoelectric elements 310 and 320 and the elastic body 500 is not deformed. The positions of the tips of the arrows are the positions of the tips of the protrusions 521 and 522 when voltages are applied to the first and second piezoelectric elements 310 and 320 and the elastic body 500 is deformed.

Figure 5A:
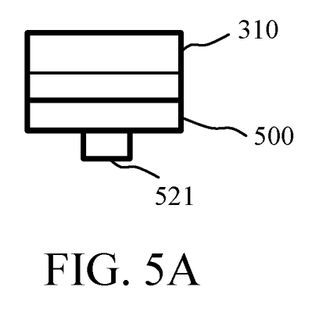
FIGS. 5A and 5B are schematic views illustrating an elastic body in a deformed state.
Figure 5B:
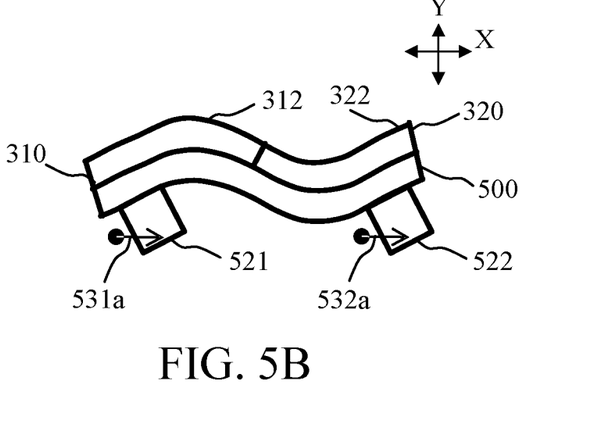

FIGS. 5A and 5B illustrate deformed states of the first and second piezoelectric elements 310 and 320 and the elastic body 500 at time t1 in FIGS. 4A and 4B. At time t1, positive and negative voltages are applied to the first and second piezoelectric elements 310 and 320, respectively. Therefore, the first piezoelectric element 310 extends in the in-plane direction, and the second piezoelectric element 320 contracts in the in-plane direction. At this time, since the elastic body 500 maintains its original size, the elastic body 500 is bent and deformed, and a non-joint surface 312 on the side opposite to the joint surface 311 in the first piezoelectric element 310 becomes convex. A non-joint surface 322 of the second piezoelectric element 320 becomes concave. Thereby, the tips of the protrusions 521 and 522 move to the right as indicated by arrows 531a and 532a in FIG. 5B, respectively. At time t1, a difference between the voltages applied to the first and second piezoelectric elements 310 and 320 becomes maximum. A moving amount of the tip of each of the protrusions 521 and 522 to the right is also maximum.

Figure 6A:
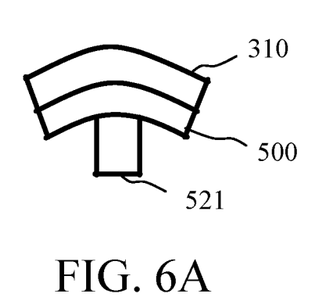
FIGS. 6A and 6B are schematic views illustrating the elastic body in another deformed state.
Figure 6B:
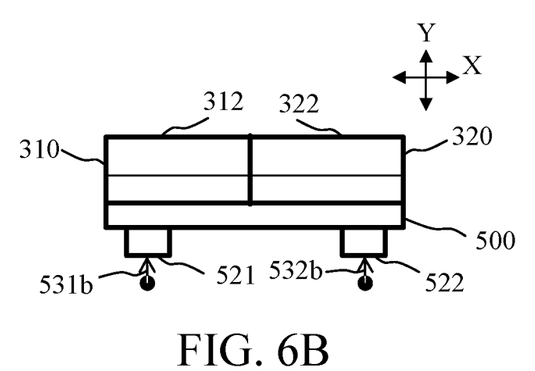

FIGS. 6A and 6B illustrate deformed states of the first and second piezoelectric elements 310 and 320 and the elastic body 500 at time t2 in FIGS. 4A and 4B. At time t2, positive voltages are applied to both the first and second piezoelectric elements 310 and 320. Both the first and second piezoelectric elements 310 and 320 extend in the in-plane direction. At this time, since the elastic body 500 maintains its original size, the elastic body 500 is bent and deformed, and the non-joint surfaces 312 and 322 are both convex. Thereby, the tips of the protrusions 521 and 522 move upward as shown by the arrows 531b and 532b in FIG. 6B, respectively. At time t2, a sum of the voltages applied to the first and second piezoelectric elements 310 and 320 becomes maximum. Therefore, a moving amount in the upward direction of each tip of the protrusions 521 and 522 is also maximum.

Figure 7A:
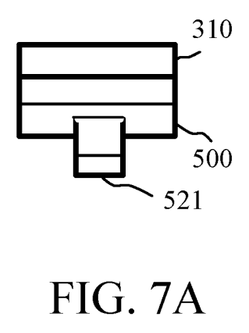
FIGS. 7A and 7B are schematic views illustrating the elastic body in another deformed state.
Figure 7B:
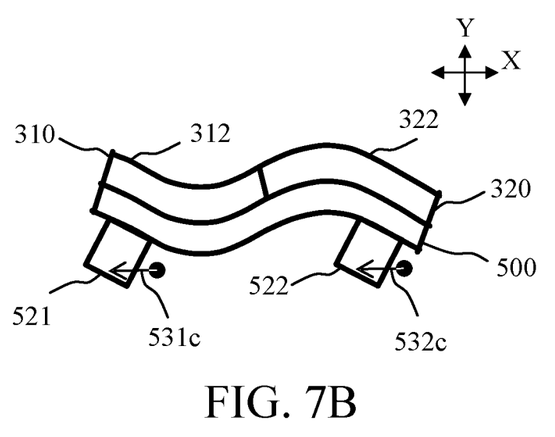

FIGS. 7A and 7B illustrate deformed states of the first and second piezoelectric elements 310 and 320 and the elastic body 500 at time t3 in FIGS. 4A and 4B. At time t3, negative and positive voltages are applied to the first and second piezoelectric elements 310 and 320, respectively. Therefore, the first piezoelectric element 310 contracts in the in-plane direction, and the second piezoelectric element 320 expands in the in-plane direction. At this time, since the elastic body 500 maintains its original size, the elastic body 500 is bent and deformed, the non-joint surface 312 becomes concave, and the non-joint surface 322 becomes convex. As a result, the tips of the protrusions 521 and 522 move to the left as shown by arrows 531c and 532c in FIG. 7B, respectively. At time t3, the difference between the voltages applied to the first and second piezoelectric elements 310 and 320 becomes maximum similar to time t1. Therefore, a moving amount of the tip of each of the protrusions 521 and 522 to the left is also maximum.

Figure 8A:
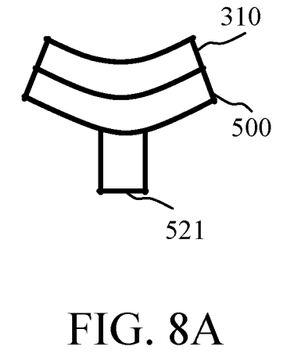
FIGS. 8A and 8B are schematic views illustrating the elastic body in another deformed state.
Figure 8B:
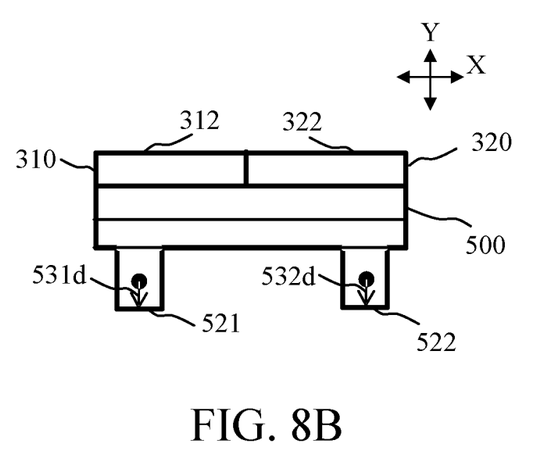

FIGS. 8A and 8B show deformed states of the first and second piezoelectric elements 310 and 320 and the elastic body 500 at time t4 in FIGS. 4A and 4B. At time t4, a negative voltage is applied to both the first and second piezoelectric elements 310 and 320. Therefore, both the first and second piezoelectric elements 310 and 320 contract in the in-plane direction. At this time, since the elastic body 500 maintains its original size, the elastic body 500 is bent and deformed, and the non-joining surfaces 312 and 322 are both concave. As a result, the tips of the protrusions 521 and 522 move downward as shown by arrows 531d and 532d in FIG. 8B, respectively. At time t4, a sum of the voltages applied to the first and second piezoelectric elements 310 and 320 becomes maximum as at time t2. Thus, the amount of downward movement of the tips of the protrusions 521 and 522 is also maximized.

Thus, by applying the periodic driving signals 900 and 901 to the first and second piezoelectric elements 310 and 320, the tips of the protrusions 521 and 522 repeat the movements illustrated in FIGS. 5B, 6B, 7B, and 8B to make elliptical motions.

Figure 9:
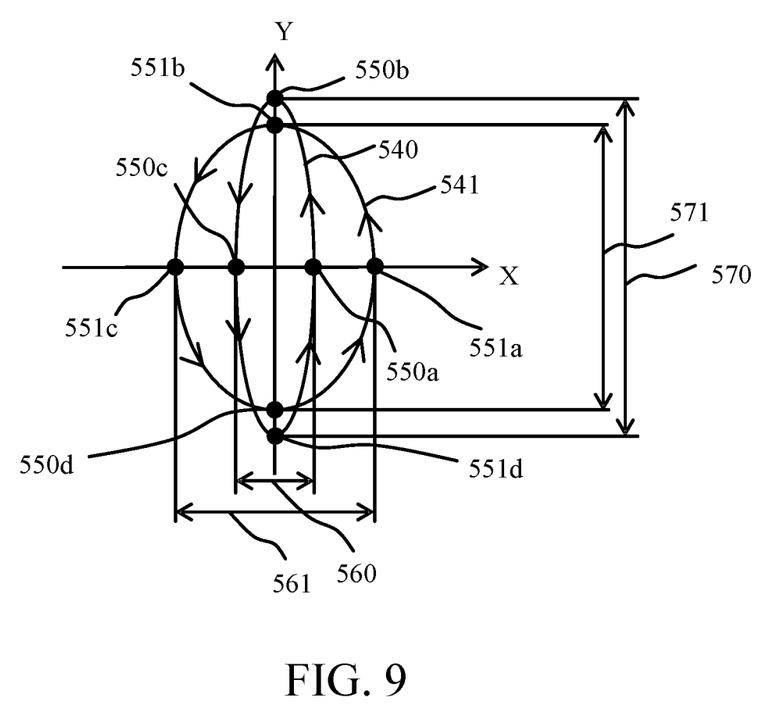
FIG. 9 illustrates a moving locus of protrusions of the elastic body.

FIG. 9 illustrates an example of the moving locus of each tip of the protrusions 521 and 522 in the elliptical motion. A horizontal axis and a vertical axis indicate the positions of the tips of the protrusions in the X and Y directions in FIG. 3, respectively. The tips of the protrusions 521 and 522 move to positions 550a, 550b, 550c and 550d at times t1, t2, t3 and t4 when the phase difference θ of the driving signals 900 and 901 is a first phase difference. This movement is cyclically repeated to make an elliptical motion so as to draw an elliptical locus 540. The tips of the protrusions 521 and 522 move to positions 551a, 551b, 551c, and 551d at times t1, t2, t3, and t4 when the phase difference θ of the driving signals 900 and 901 is a second phase difference larger than the first phase difference, and this movement is cyclically repeated to make an elliptical motion so as to draw an elliptical locus 541.

The tips of the protrusions 521 and 522 are separated from the friction member 600 in the Y direction from positions 550a and 551a to positions 550c and 551c via positions 550b and 551b when the phase difference θ is the first phase difference and the second phase difference, respectively, and thus the friction member 600 does not move. Thereafter, the tips of the protrusions 521 and 522 move in the X direction by moving amounts 560 and 561 from the positions 550c and 551c to the positions 550a and 551a via positions 550d and 551d while thrusting in the Y direction against the friction member 600. At this time, the friction member 600 also moves in the X direction by the same moving amount. The moving amounts 560 and 561 of the tips of the protrusions 521 and 522 in the X direction are the amplitudes of the elliptical motions in one period of the driving signals 900 and 901 in the X direction, and will be referred to as feed amplitudes in the following description. Moving amount 570 and 571 of the tips of the protrusions 521 and 522 in one period of the driving signals 900 and 901 in the Y direction (that is, the amplitude of the elliptical motion in the Y direction) will be referred to as thrust amplitudes in the following description.

The friction member 600 can be continuously moved in the X direction by repeatedly generating the feed amplitudes 560 and 561 at the tips of the protrusions 521 and 522 every period of the driving signals 900 and 901.

When the feed amplitudes are equal, the shorter the period Ta of the driving signal is, the higher the moving speed of the friction member 600 becomes. When the period Ta is the same, the larger the feed amplitude 560 is, the higher the moving speed of the friction member 600 becomes. Since the thrust amplitude is not involved in the movement of the friction member 600, the larger the thrust amplitude is, the larger the power loss becomes.

As the phase difference θ approaches to Ta/2, a difference between the applied voltages at times t1 and t3 increases, and a sum of the absolute values of the applied voltages at times t2 and t4 decreases. The feed amplitude increases and the thrust amplitude decreases. When the phase difference θ becomes Ta/2, times t1 and t3 correspond to Ta/4 and 3Ta/4, respectively, and a difference between the applied voltages at the times becomes maximum 2Va. Times t2 and t4 correspond to Ta/2 and Ta, respectively, and a sum of the applied voltages at the times becomes 0. The feed amplitude becomes maximum and the thrust amplitude becomes zero.

As the phase difference θ approaches to 0, a difference between the applied voltages at times t1 and t3 decreases, and a sum of the absolute values of the applied voltages at times t2 and t4 increases. The feed amplitude decreases and the thrust amplitude increases. When the phase difference θ becomes 0, times t1 and t3 correspond to 0 and Ta/2, respectively, and a difference between the applied voltages at the times becomes zero. Times t2 and t4 correspond to Ta/4 and 3Ta/4, respectively, and a sum of the applied voltages at that time is maximum 2Va. Therefore, the feed amplitude becomes 0 and the thrust amplitude becomes maximum.

In FIG. 9, when the phase difference θ of the driving signals 900 and 901 is close to 0, the tips of the protrusions 521 and 522 move so as to draw an elliptical locus 540 with a small feed amplitude 560. When the phase difference θ of the driving signals 900 and 901 is close to Ta/2, the tips of the protrusions 521 and 522 move so as to draw an elliptical locus 541 with a large amplitude 561. Thus, by changing the phase difference θ, the magnitude of the feed amplitude can be changed and the moving amount and the speed of the friction member 600 can be changed.

Figure 10:
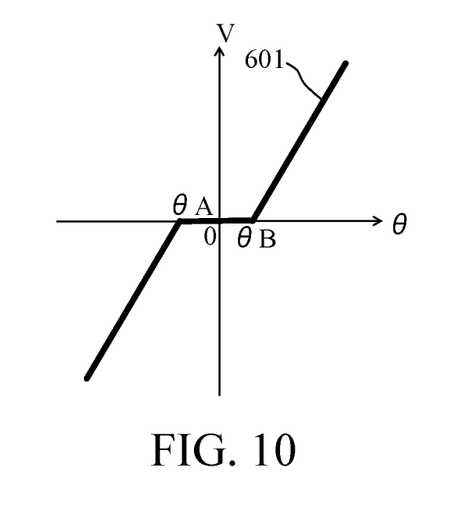
FIG. 10 illustrates a relationship between a phase difference θ and a speed V of the vibration type actuator.

FIG. 10 illustrates an example of a relationship between the phase difference θ and the moving speed V of the friction member 600. A horizontal axis represents the phase difference θ, and a vertical axis represents the moving speed V. A line 601 indicates the moving speed V for each phase difference θ. As illustrated in this figure, when the phase difference θ is smaller than a phase difference θA and larger than a phase difference θB, the moving speed V decreases and increases as the phase difference θ decreases and increases, respectively. On the other hand, when the phase difference θ is between the phase differences θA and θB, the moving speed V is always 0, that is, the friction member 600 is in the stopped state even if the phase difference θ changes.

As illustrated in FIG. 9, when the phase difference θ is small, the feed amplitude 560 becomes small and the thrust amplitude 570 becomes large. If the thrust amplitude 570 becomes too large, the frictional forces generated between the tips of the protrusions 521 and 522 and the friction member 600 decreases, and the feed amplitude 560 of the tips of the protrusions 521 and 522 is not transmitted to the friction member 600. Therefore, as illustrated in FIG. 10, in a region where the phase difference θ is small (θA to θB), the moving speed V remains 0 even if the phase difference θ changes. This phase difference region is called a dead zone. The phase difference corresponding to the dead zone and its width change due to various factors such as changes in an orientation of (an apparatus mounted with) the vibration type actuator 2, environmental (e.g., temperature) changes, and changes over time.

Figure 11:
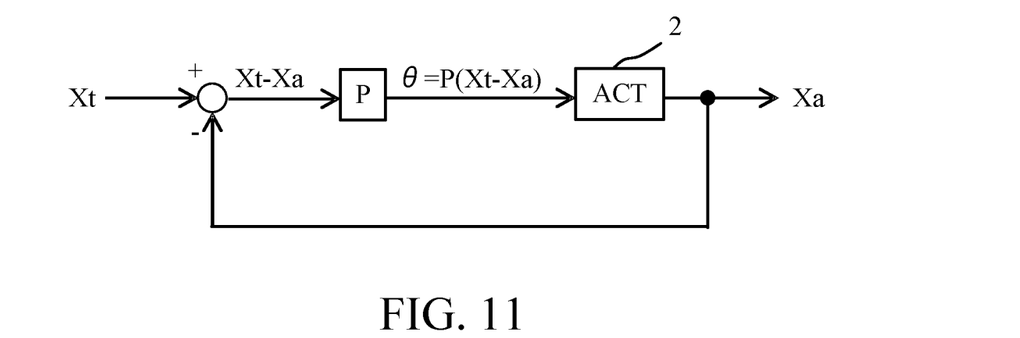
FIG. 11 illustrates a control block of the vibration type actuator driving system.

FIG. 11 illustrates a configuration of a proportional control in the driving signal generating unit 400. The driving signal generating unit 400 calculates a deviation (Xt−Xa) from the target position Xt acquired from the position command unit 100 and the actual position Xa acquired from the position detecting unit 200. Then, by multiplying the deviation (Xt−Xa) by a proportional gain P, a product P(Xt−Xa) is calculated. The driving signal generating unit 400 sets the phase difference θ of the driving signals 900 and 901 to P(Xt−Xa) to generate the driving signals 900 and 901, and applies them to the first and second piezoelectric elements 310 and 320 of the vibration type actuator 2.

Figure 12:
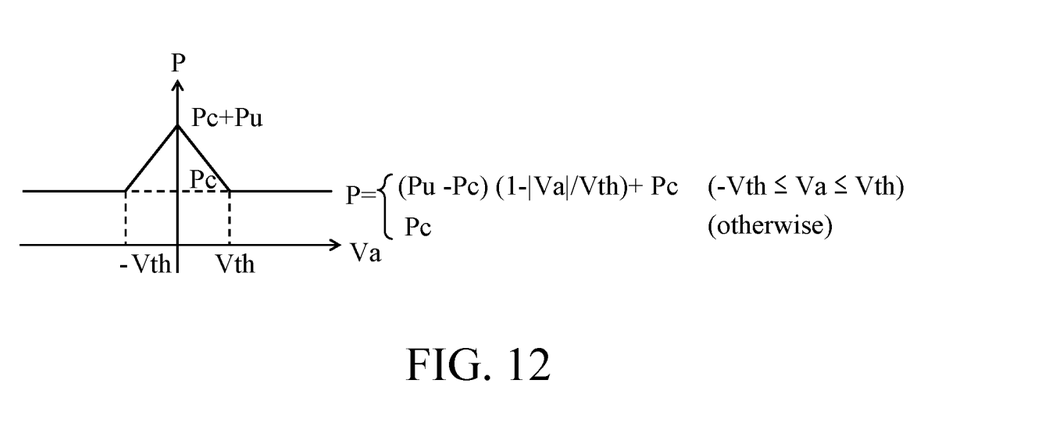
FIG. 12 illustrates a proportional gain in the vibration type actuator driving system.

FIG. 12 illustrates the setting of the proportional gain P illustrated in FIG. 11. A horizontal axis represents the actual speed Va of the friction member 600, and a vertical axis represents the proportional gain P. The actual moving speed Va of the friction member 600 can be calculated by the driving signal generating unit 400 based on the actual position Xa detected by the position detecting unit 200.

As illustrated in FIG. 12, the proportional gain P is set to change according to the magnitude of the actual moving speed Va. More specifically, the proportional gain P is set to the maximum value (first value) Pc+Pu when the friction member 600 is in the stopped state in which the actual moving speed Va is 0. The proportional gain P decreases as the magnitude |Va| of the actual moving speed Va increases in accordance with P=(Pu−Pc)(1−|Va|/Vth)+Pc, and is set to a constant value (second value) Pc when |Va| exceeds a threshold (predetermined speed) Vth.

This embodiment changes the proportional gain P according to the actual moving speed Va, but the present invention is not limited to this embodiment, and for example, the proportional gain P may be changed according to the target speed Vt. This embodiment has discussed the proportional control over the vibration type actuator 2, but the present invention is not limited to this embodiment, and various controls, such as an integral control and a differential control, may be performed. In the integral control and differential control, the phase difference is set from the integral value of the deviation as a value corresponding to the deviation or a product of the differential value and the integral value or the differential gain.

FIGS. 13, 14, 15, 16, and 17 illustrate the position X (target position Xt and actual position Xa) of the friction member 600, deviation (Xt−Xa), proportional gain P, and changes of the phase difference θ and the actual moving speed Va (vertical axis) for each time t (horizontal axis) in this embodiment, respectively.

Figure 13:
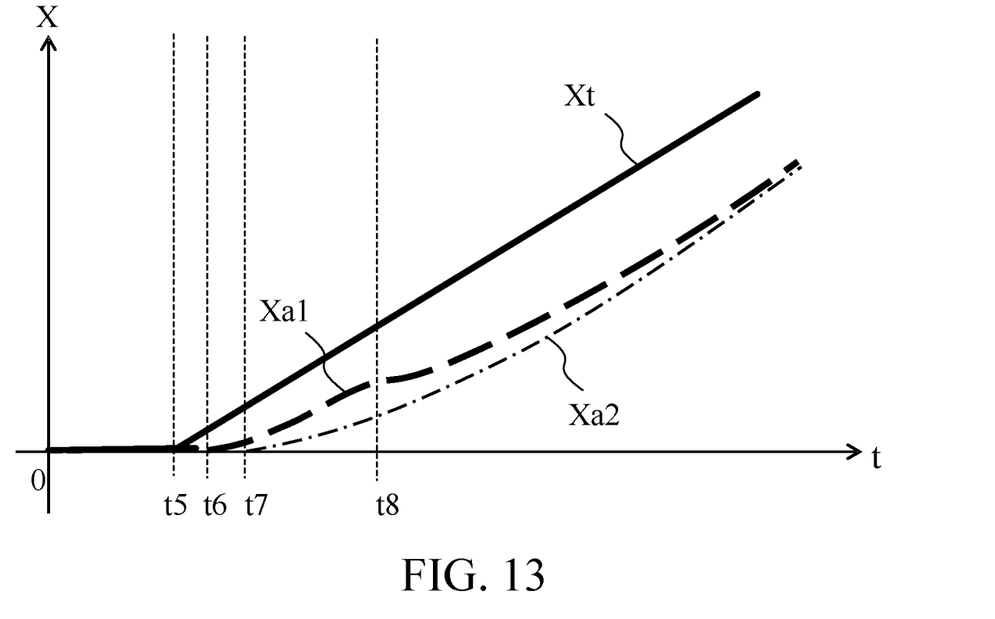
FIG. 13 illustrates a time change in a position of a movable unit according to this embodiment.

In FIG. 13, the target position Xt shown by a solid line is located at a stop position from time 0 to time t5, and indicates a position that moves at a constant speed after time t5. An actual position Xa1 shown by a broken line is the actual position of the friction member 600 in this embodiment that sets the proportional control and the proportional gain illustrated in FIGS. 11 and 12 in relation to a relationship between the phase difference θ and the moving speed V illustrated in FIG. 10, and illustrates the time change of the response position against the target position Xt. An actual position Xa2 shown by an alternate long and short dash line is the actual position of the friction member 600 in the conventional example in which the proportional gain P is always constant at Pc in the control illustrated in FIG. 11, and illustrates a time change of the response position against the target position Xt.

A deviation (Xt−Xa1), a proportional gain P1, a phase difference θ1, and an actual moving speed Va1 shown by solid lines in FIGS. 14 to 17 illustrate time changes of the respective values in the proportional control and the proportional gain setting illustrated in FIGS. 11 and 12. A deviation (Xt−Xa2), a proportional gain P2, a phase difference θ2, and an actual moving speed Va2 shown by alternate long and short dash lines illustrate time changes of the respective values in the above conventional example.

In this embodiment and the conventional example, when the target position Xt starts changing at time t5, both the deviation (Xt−Xa1) and the deviation (Xt−Xa2) increase according to changes of the target position Xt. Since the actual moving speed V1 is 0 at time t5, the proportional gain P1 in this embodiment is a maximum value Pc+Pu. On the other hand, the proportional gain P2 in the conventional example is always constant at Pc. Therefore, in the phase differences θ1 and θ2 set as products of the proportional gains P1 and P2 and the deviations (Xt−Xa1) and (Xt−Xa2), an increase amount of the phase difference θ1 is larger than that of the phase difference θ2. The phase difference θ1 in this embodiment reaches the phase difference θB earlier at which the friction member 600 starts moving at time t6.

As a result, as illustrated in FIG. 13, in this embodiment, the friction member 600 starts moving at time t6 earlier than that in the conventional example. On the other hand, in the conventional example, the phase difference θ2 reaches the phase difference θB at time t7 later than time t6, and the friction member 600 starts moving. Thus, since the friction member in this embodiment starts moving earlier than that in the conventional example, the followability of the friction member 600 to the target position Xt is improved.

Figure 14:
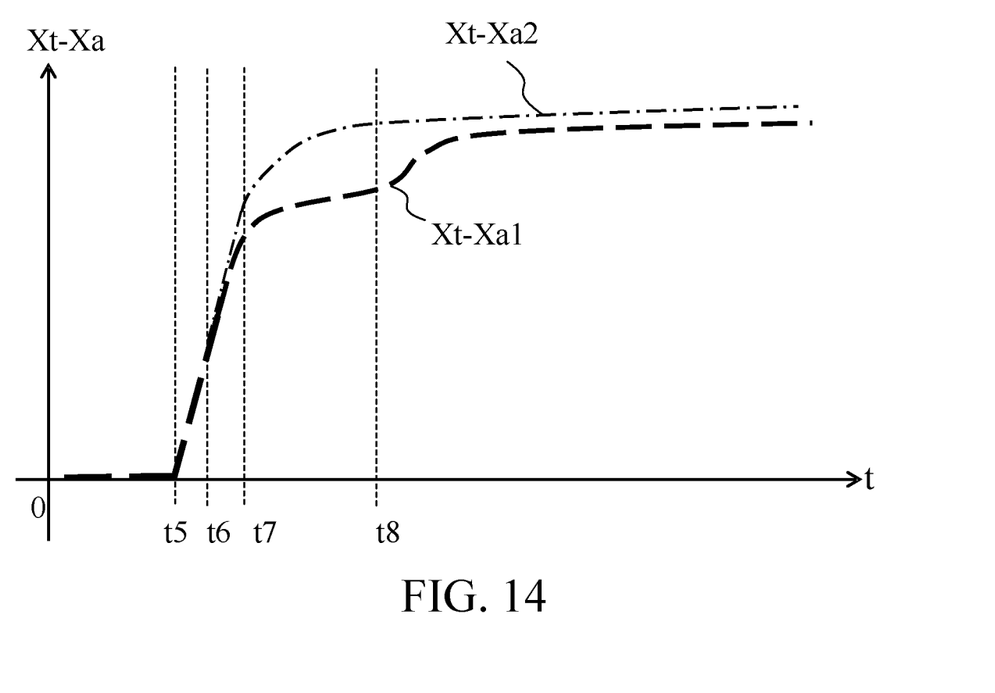
FIG. 14 illustrates a time change of a deviation according to this embodiment.
Figure 15:
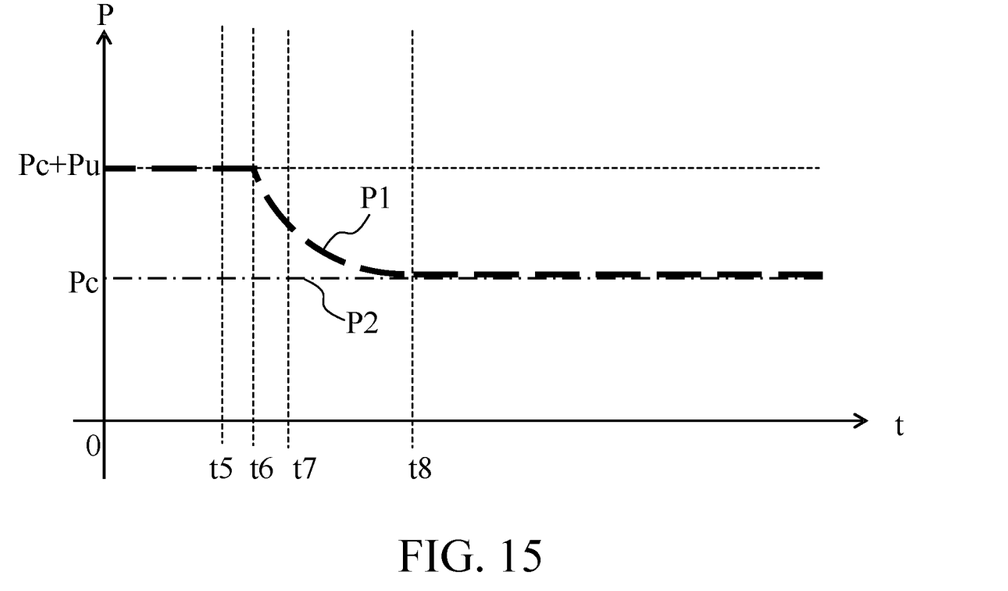
FIG. 15 illustrates a time change of a proportional gain according to this embodiment.

As illustrated in FIG. 14, the friction member 600 starts moving from time t6 in this embodiment and from time t7 in the conventional example, and the increase amounts of the deviations (Xt−Xa1) and (Xt−Xa2) gradually decrease. As illustrated in FIG. 15, in this embodiment, when the friction member 600 starts moving from time t6, the proportional gain P1 decreases as the actual moving speed Va1 increases, and becomes constant at the proportional gain Pc at time t8 at which the moving speed V1 reaches the threshold Vth.

Figure 16:
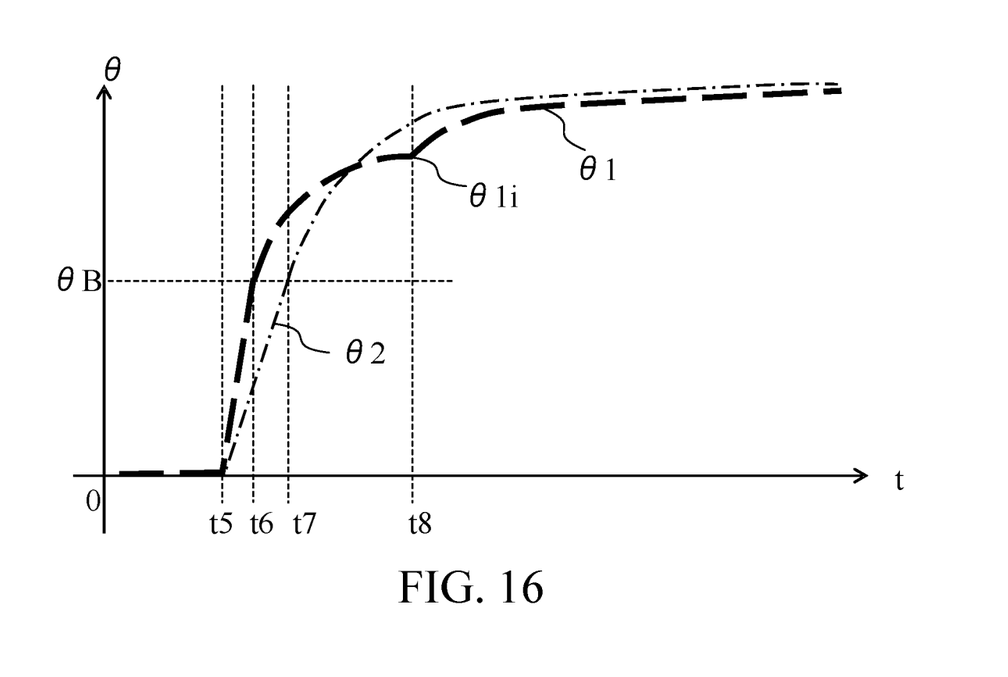
FIG. 16 illustrates a time change of a phase difference according to this embodiment.
Figure 17:
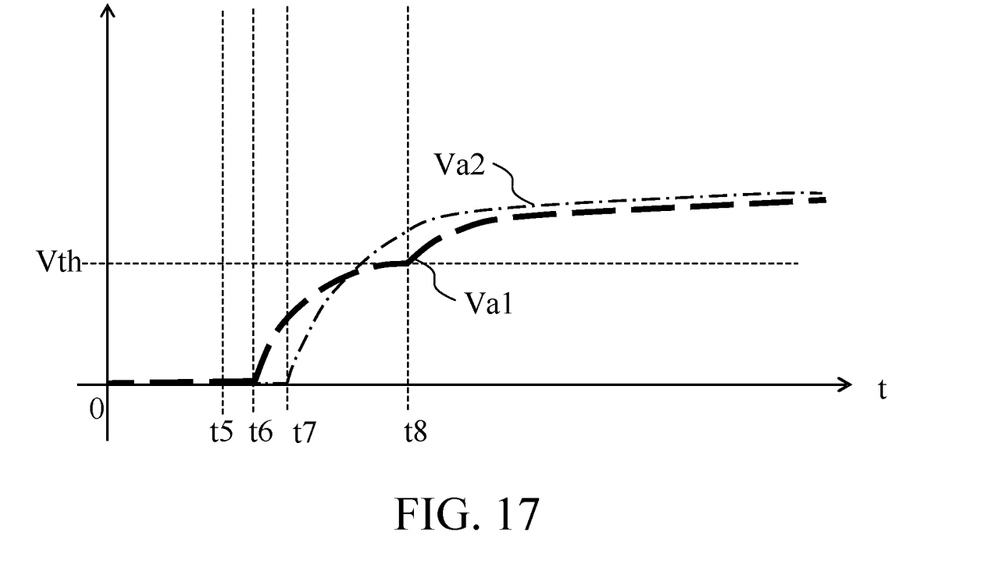
FIG. 17 illustrates another time change of the phase difference according to this embodiment.

In this embodiment, as illustrated in FIG. 16, from time t6 to time t8, the increase rate of the deviation (Xt−Xa1) decreases and the proportional gain P1 also decreases, and thus the increase rate (change rate) of the phase difference θ1 as the product of them gradually decreases. After time t8, the increase rate of the deviation (Xt−Xa1) still decreases, but the proportional gain P1 becomes a constant value and thus the increase rate of the phase difference θ1 temporarily increases at time t8, and thereafter the increase rate of the phase difference θ1 decreases as the deviation (Xt−Xa1) decreases.

On the other hand, in the conventional example, the proportional gain P2 is constant and thus the increase rate of the phase difference θ1 decreases as the increase rate of the deviation (Xt−Xa2) decreases.

From the above, in this embodiment, after the friction member 600 starts moving, the phase difference θ1 changes so as to have an inflection point θi. More specifically, the increase rate (change rate) of the phase difference θ1 decreases once after the friction member 600 starts moving, and then the increase rate of the phase difference θ1 increases until the actual moving speed V1a of the friction member 600 approaches to the target speed and the increase rate of the phase difference θ1 decreases when the actual movement speed V1a becomes closer to the target speed.

As described above, this embodiment makes larger the change rate of the phase difference θ1 against the deviation (Xt−Xa1) until the friction member 600 starts moving than the change rate after the friction member 600 starts moving. Thereby, the increase rate of the phase difference θ1 just after the target position Xt starts changing can be larger than that in the conventional example, and the phase difference θ1 can pass through the dead zone and quickly reach the phase difference θB at which the friction member 600 starts moving. Hence, the followability of the friction member 600 on the target position Xt can be improved. This embodiment gradually decreases the proportional gain P1 as the actual moving speed Va1 increases and thus does not abruptly change the phase difference θ1, so that the friction member 600 can be moved smoothly and stably.

This embodiment decreases the proportional gain P1 only in a low-speed range (until time t8) after the friction member 600 starts moving. In a high-speed range where an oscillation phenomenon is likely to occur in the vibration type actuator 2 when the proportional gain P1 is large, the proportional gain P1 can be set to the same as that in the conventional example and a stable control can be performed. This embodiment changes the proportional gain P1 based on the actual moving speed Va1, even if the dead zone changes due to the above factors and the phase difference θB changes at which the friction member 600 starts moving, the good controllability can be maintained in the phase difference control.

Figure 18:
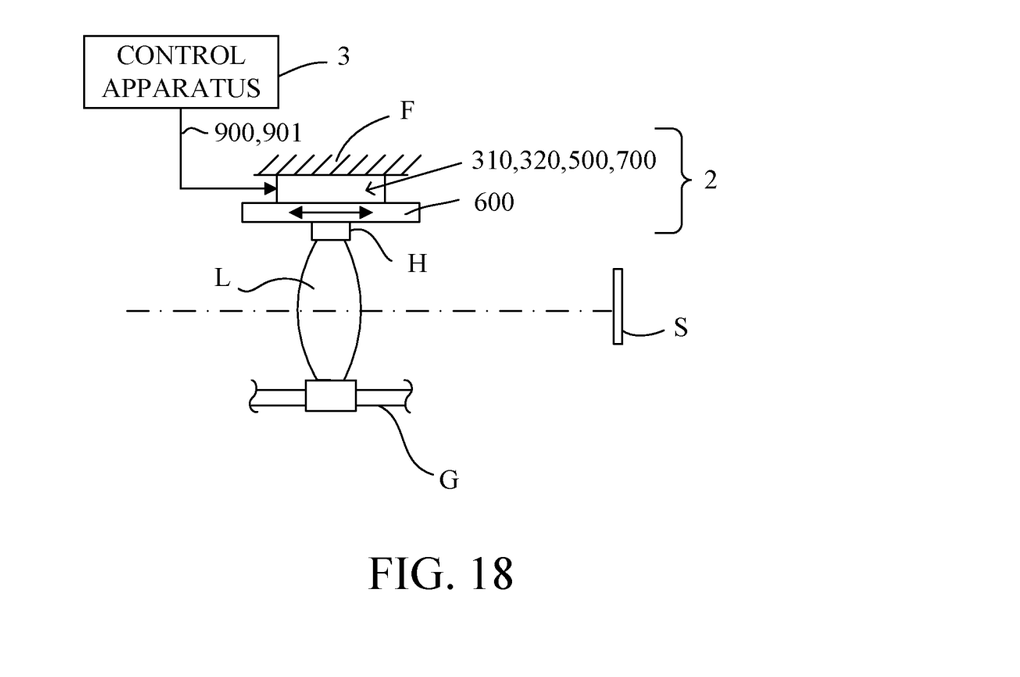
FIG. 18 illustrates an example of a driving apparatus including the vibration type actuator.

FIG. 18 illustrates an image pickup device (camera) as a driving apparatus including the vibration type actuator 2 and control apparatus 3. A fixed portion of the vibration type actuator 2 (including the first piezoelectric element 310, the second piezoelectric element 320, the elastic body 500, and the holding member 700) is fixed to the fixing member F in the image pickup apparatus.

On the other hand, a lens holding member H is fixed to the friction member 600 of the vibration type actuator 2, and the lens holding member H holds a lens L as a driven member. A movable unit includes the friction member 600, the lens holding member H, and the lens L. The lens holding member H is guided in an optical axis direction (object side and image side) by a guide member G.

An image sensor S such as a CCD sensor or a CMOS sensor that captures an optical image formed by light incident from the object side and passing through the lens L is provided on the image side of the lens L.

When two-phase driving signals 900 and 901 are applied from the control apparatus 3 to the first and second piezoelectric elements 310 and 320 to excite the vibrations in the elastic body 500, the lens L is driven in the optical axis direction via the friction member 600. Thereby, focusing of the optical image formed on the image sensor S is made. For example, when a moving object is imaged, the control apparatus 3 ensures good followability and controllability of the vibration type actuator 2, so that good focus followability to the moving object can be obtained. The magnification may be varied by moving the lens L to change the imaging angle of view.

Although the image pickup apparatus has been described, various driving apparatuses for driving the driven member by the vibration type actuator may be included in the embodiment of the present invention.

This embodiment can provide good controllability in the phase difference control of the vibration type actuator.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-213376, filed on Dec. 23, 2020, which is hereby incorporated by reference herein in its entirety.

What is claimed is:

1. A control apparatus for a vibration type actuator that moves a vibrating body in which vibrations are excited by an electromechanical energy conversion element, and a contact body in contact with the vibrating body relative to each other, the control apparatus comprising:
    a generation unit configured to generate multi-phase driving signals having a phase difference applied to the electromechanical energy conversion element; and
    a detection unit configured to detect an actual position of a movable unit including the vibrating body or the contact body,
    wherein the generation unit sets the phase difference based on a deviation of the actual position from a target position of the movable unit,
    wherein the generation unit makes larger a change rate of the phase difference against the deviation from when the movable unit stops to when the movable unit starts moving as the target position changes than that after the movable unit starts moving, and
    wherein at least one processor or circuit is configured to perform a function of at least one of the generation unit and the detection unit.

2. The control apparatus according to claim 1, wherein the generation unit sets the phase difference from a product of a gain and a value corresponding to the deviation of the actual position from the target position of the movable unit, and
    wherein the generation unit makes larger the gain from when the movable unit stops to when the movable unit starts moving as the target position changes than that after the movable unit starts moving.

3. The control apparatus according to claim 2, wherein the generation unit sets the gain in a state where the movable unit stops to a first value, and
    wherein the generation unit reduces the gain from the first value as a moving speed of the movable unit increases after the movable unit starts moving.

4. The control apparatus according to claim 3, wherein the generation unit maintains constant the gain at a second value lower than the first value after the moving speed has increased up to a predetermined speed.

5. The control apparatus according to claim 1, wherein the generation unit makes larger an increase rate of the phase difference from when the movable unit stops to when the movable unit starts moving than that after the movable unit starts moving, and decreases the increase rate once and then increases the increase rate when the movable unit starts moving and accelerating.

6. The control apparatus according to claim 1, wherein in the vibration type actuator, a portion of the vibrating body that contacts the contact body makes an elliptical motion due to the vibrations, and an amplitude of the movable unit in a moving direction in the elliptical motion changes according to the phase difference.

7. A driving apparatus comprising:
    the control apparatus according to claim 1;
    the vibration type actuator; and
    a driven member driven by the vibration type actuator.

8. A control apparatus for a vibration type actuator that moves a vibrating body in which vibrations are excited by an electromechanical energy conversion element, and a contact body in contact with the vibrating body relative to each other, the control apparatus comprising:
    a generation unit configured to generate multi-phase driving signals having a phase difference applied to the electromechanical energy conversion element; and
    a detection unit configured to detect an actual position of a movable unit including the vibrating body or the contact body,
    wherein the generation unit sets the phase difference based on a deviation of the actual position from a target position of the movable unit,
    wherein the generation unit makes larger an increase rate of the phase difference from when the movable unit stops to when the movable unit starts moving than that after the movable unit starts moving, and decreases the increase rate once and then increases the increase rate when the movable unit starts moving and accelerating, and
    wherein at least one processor or circuit is configured to perform a function of at least one of the generation unit and the detection unit.

9. The control apparatus according to claim 8, wherein a portion of the vibrating body in the vibration type actuator that contacts the contact body makes an elliptical motion due to the vibrations, and an amplitude of the movable unit in a moving direction in the elliptical motion changes according to the phase difference.

10. A driving apparatus comprising:
    the control apparatus according to claim 8;
    the vibration type actuator; and
    a driven member driven by the vibration type actuator.

11. A control method for a vibration type actuator that moves a vibrating body in which vibrations are excited by an electromechanical energy conversion element, and a contact body in contact with the vibrating body relative to each other, the control method comprising:

generating multi-phase driving signals having a phase difference applied to the electromechanical energy conversion element; and     detecting an actual position of a movable unit including the vibrating body or the contact body,     wherein the generating sets the phase difference based on a deviation of the actual position from a target position of the movable unit, and     wherein the generating makes larger a change rate of the phase difference against the deviation from when the movable unit stops to when the movable unit starts moving as the target position changes than that after the movable unit starts moving.

12. A storage medium storing a program that causes a computer to execute the control method according to claim 11.

13. A control method for a vibration type actuator that moves a vibrating body in which vibrations are excited by an electromechanical energy conversion element, and a contact body in contact with the vibrating body relative to each other, the control method comprising:

generating multi-phase driving signals having a phase difference applied to the electromechanical energy conversion element; and     detecting an actual position of a movable unit including the vibrating body or the contact body,     wherein the generating sets the phase difference based on a deviation of the actual position from a target position of the movable unit, and     wherein the generating makes larger an increase rate of the phase difference from when the movable unit stops to when the movable unit starts moving than that after the movable unit starts moving, and decreases the increase rate once and then increases the increase rate when the movable unit starts moving and accelerating.

14. A storage medium storing a program that causes a computer to execute the control method according to claim 13.

* * * * *